(12) United States Patent
Tesner et al.

(10) Patent No.: US 10,948,068 B2
(45) Date of Patent: Mar. 16, 2021

(54) TRANSMISSION PRESSURE CONTROLLED VENT SYSTEM

(71) Applicant: GM Global Technology Operations LLC, Detroit, MI (US)

(72) Inventors: Kenneth C. Tesner, Farmington Hills, MI (US); David J. Varda, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 212 days.

(21) Appl. No.: 15/909,156

(22) Filed: Mar. 1, 2018

(65) Prior Publication Data
US 2019/0271384 A1 Sep. 5, 2019

(51) Int. Cl.
| | | |
|---|---|---|
| *B01D 46/00* | (2006.01) |
| *F16H 57/027* | (2012.01) |
| *B01D 45/06* | (2006.01) |
| *F16K 24/04* | (2006.01) |
| *F16K 17/04* | (2006.01) |

(Continued)

(52) U.S. Cl.
CPC .......... *F16H 57/027* (2013.01); *B01D 45/06* (2013.01); *B01D 53/26* (2013.01); *F16K 17/048* (2013.01); *F16K 24/04* (2013.01); *B01D 2279/30* (2013.01); *C04B 38/0006* (2013.01); *F01N 3/0222* (2013.01); *F01N 3/035* (2013.01); *F16H 57/00* (2013.01); *F16H 57/0417* (2013.01); *F16K 15/147* (2013.01); *F16K 17/02* (2013.01); *F16K 17/044* (2013.01); *F16K 17/0406* (2013.01); *F16K 24/00* (2013.01); *Y10S 55/30* (2013.01)

(58) Field of Classification Search
CPC ........ B01D 45/08; B01D 45/06; B01D 45/16; B01D 50/002; B01D 53/26; A47L 9/1683; F16H 57/027; F16H 57/00; F16H 57/0417; F16K 24/04; F16K 17/048; F16K 24/00; F16K 15/147; F16K 17/0406; F16K 17/02; F16K 17/044; Y10T 137/7779
See application file for complete search history.

(56) References Cited

U.S. PATENT DOCUMENTS

| | | | | |
|---|---|---|---|---|
| 1,509,674 A | * | 9/1924 | Koehler | ................... F23J 11/00 423/245.3 |
| 2,351,874 A | * | 6/1944 | Parker | ................... F16K 17/196 137/493.8 |

(Continued)

*Primary Examiner* — Dung H Bui

(57) ABSTRACT

A transmission having a pressure controlled vent system, including a vent tube configured to engage a transmission such that a first opening of the vent tube is in fluid communication with an upper portion of a transmission cavity, a second end defining a second opening configured to be in fluid communication with an external atmosphere, and a bifurcated portion between the first end and the second end. The bifurcated portion includes a first tube segment and a second tube segment in parallel with the first tube segment. A pressure relief valve disposed in-line within the first tube segment and a vacuum relief valve disposed in-line within the second tube segment. The pressure relief valve cooperates with the vacuum relief valve to maintain a predetermined range of pressure differential between the first opening and the second opening. The vent tube may also include a moisture and/or a transmission fluid separator.

13 Claims, 3 Drawing Sheets

(51) Int. Cl.
  *B01D 53/26* (2006.01)
  *F01N 3/035* (2006.01)
  *F01N 3/022* (2006.01)
  *C04B 38/00* (2006.01)
  *F16K 24/00* (2006.01)
  *F16K 15/14* (2006.01)
  *F16H 57/00* (2012.01)
  *F16K 17/02* (2006.01)
  *F16H 57/04* (2010.01)

(56) References Cited

U.S. PATENT DOCUMENTS

| | | | | |
|---|---|---|---|---|
| 2,392,038 A * | 1/1946 | Gaylord | ............... | F24C 15/20 126/299 D |
| 3,345,931 A * | 10/1967 | Walsh | ............... | F23L 17/02 454/38 |
| 3,616,744 A * | 11/1971 | Jensen | ............... | F24C 15/20 126/299 E |
| 4,066,064 A * | 1/1978 | Vandas | ............... | A62C 2/241 126/299 E |
| 4,281,635 A * | 8/1981 | Gaylord | ............... | F24C 15/20 126/299 D |
| 4,337,873 A * | 7/1982 | Johnson | ............... | B60K 15/0406 137/493.8 |
| 4,475,534 A * | 10/1984 | Moriarty | ............... | F24C 15/2028 126/299 D |
| 4,987,882 A * | 1/1991 | Kaufman | ............... | F24C 15/20 126/299 D |
| 5,054,511 A * | 10/1991 | Tuan | ............... | B60C 23/0496 137/224 |
| 5,129,422 A | 7/1992 | Davison, Jr. et al. | | |
| 5,449,018 A * | 9/1995 | Harris | ............... | B60K 15/03519 137/43 |
| 5,462,086 A * | 10/1995 | Taylor | ............... | F16K 11/16 137/865 |
| 5,509,949 A | 4/1996 | Gluys et al. | | |
| 5,906,195 A * | 5/1999 | Georgaras | ............... | F24C 15/20 126/299 D |
| 5,960,822 A * | 10/1999 | Matuschka | ............... | F15B 13/027 137/493.8 |
| 6,041,772 A * | 3/2000 | Ward | ............... | F24C 15/20 126/299 D |
| 6,053,896 A * | 4/2000 | Wilson | ............... | A61M 1/367 137/218 |
| 6,125,841 A * | 10/2000 | Boudreault | ............... | B08B 9/00 126/299 D |
| 6,470,909 B2 * | 10/2002 | Osterlanger | ............... | F15B 13/027 137/493.8 |
| 8,246,705 B2 * | 8/2012 | Bain | ............... | F24C 15/20 126/299 E |
| 8,404,028 B2 * | 3/2013 | Easton | ............... | C23C 16/4412 55/437 |
| 2008/0083333 A1 * | 4/2008 | Yokoi | ............... | B01D 46/26 95/277 |
| 2011/0173935 A1 | 7/2011 | Tesner et al. | | |
| 2013/0192473 A1 * | 8/2013 | Riefenstein | ............... | A47J 27/00 99/324 |
| 2013/0312645 A1 * | 11/2013 | Deng | ............... | F24B 1/189 110/297 |
| 2016/0201838 A1 * | 7/2016 | Flanders | ............... | F17D 1/08 137/12 |
| 2017/0220053 A1 * | 8/2017 | Shu | ............... | F16K 17/16 |
| 2017/0336812 A1 * | 11/2017 | Dante | ............... | G05D 16/2033 |

* cited by examiner

TRANSMISSION PRESSURE CONTROLLED VENT SYSTEM

INTRODUCTION

The present disclosure relates to a system for venting a gearbox, more particularly, to a pressure controlled vent system for a transmission of a motor vehicle.

The statements in this section merely provide background information related to the present disclosure and may or may not constitute prior art. Mechanical transmissions for a motor vehicle, whether manual or automatic, utilize a transmission fluid disposed within the transmission housing to accomplish various functions, such as cooling of the transmission, lubricating of rotating parts, and hydraulically transferring of torque. Over the operating conditions of the motor vehicle, the transmission fluid is subjected to temperature fluctuations due to exposure to the heat generated by friction among the numerous internal working components and cooling by the transfer of heat to the external environment. Temperature fluctuations are manifested as changes in the viscosity of the transmission fluid and pressure within the transmission housing.

Various types of seals are used to retain the transmission fluid within the transmission for the proper functioning of the transmission. Rotary seals are interposed between rotating components, such as an input shaft or output shaft seal. Stationary seals are interposed between stationary components of the transmission housing, such as between the external sealing surfaces of the transmission housing. The seals function to retain the transmission fluid within the transmission while isolating the interior of the transmission from exterior contaminants. Sufficient pressure differential between the interior of the transmission and the outside of the transmission (i.e. external atmosphere) may result in deflections of the stationary seals resulting in the leakage of transmission fluid from the transmission or contaminates entering the transmission.

The heat generated by the working components of the transmission cases causes expansions of air in the transmission, transmission components, as well as the transmission fluid. The expansion of the internal air and transmission fluid results in an increased pressure within the transmission housing above that of the external atmospheric pressure. Similarly, if the transmission is exposed to sudden cooling conditions, such as if the transmission is exposed to a significant amount of water when the vehicle drives over a puddle or ford through a small stream, the pressure within the transmission may be lowered below that of the external atmospheric pressure.

If the pressure within the transmission is substantially greater than the pressure outside the transmission, the various seals are subjected to a force which may cause the seals to deflect, thus expelling the transmission fluid from the transmission. If the pressure within the transmission is substantially lower than the pressure outside the transmission, the various seals are stressed in the opposite direction and dirt, water or other contaminants may be drawn into the transmission. A pressure differential between the interior of the transmission and external atmosphere may also be created by changes in the external atmospheric pressure as the vehicle travels from a lower elevation, such as sea level, to a higher elevation, such as 10,000 feet above sea level, and vice versa.

A breather vent is provided in the transmission housing to allow for the equalization of the pressure between the interior of the transmission and external atmosphere. When the transmission heats up, the increased pressure is released to the external atmosphere together with small amounts of transmission fluid vapor entrained in the air. When the transmission cools, external air is drawn into the transmission together with the humidity and small quantities of contaminants in the atmospheric air.

Thus, it is desirable to provide a pressure controlled venting system that extends the normal service life of a transmission by reducing or eliminating unnecessary transmission fluid expulsion from the transmission and reducing unnecessary moisture and contaminants from entering the transmission.

SUMMARY

According to several aspects, a transmission having a pressure controlled vent system is disclosed. The transmission includes a transmission housing defining an internal cavity that is sealed to prevent fluid communication between the internal cavity and an external atmosphere. A pressure relief valve is provided to vent a transmission air from within the upper portion of the internal cavity to an external atmosphere when a predetermined pressure differential between the internal cavity and atmosphere is exceeded. A vacuum relief valve is provided to vent an external air into the internal cavity when a predetermined vacuum differential between the internal cavity and the external atmosphere is exceeded.

In an additional aspect of the present disclosure, the transmission further includes a vent tube having a first end defining a first opening in fluid communication with the upper portion of the internal cavity, a second end defining a second opening in fluid communication with the external atmosphere, and a bifurcated portion between the first end and the second end. The bifurcated portion includes a first tube segment and a second tube segment in parallel with the first tube segment. The pressure relief valve is disposed in-line with the first tube segment and the vacuum relief valve is disposed in-line with the second tube segment.

In another aspect of the present disclosure, one of the pressure relief valve and the vacuum relief valve includes an elastomer valve member configured to open when the predetermined pressure or vacuum differential between the internal cavity and atmosphere is exceeded.

In another aspect of the present disclosure, the transmission further includes oil separator disposed in-line with the vent tube between the bifurcated portion and the first end. The oil separator include a twining wall defining a tortuous path configured to condense a transmission fluid vapor contained in the transmission air being vented to the external atmosphere and redirect the condensed transmission fluid back into the internal cavity.

In another aspect of the present disclosure, oil separator is defined in a portion of the transmission housing proximal to an upper portion of the cavity. The oil separator includes a twining wall defining a tortuous path extending from the internal cavity to the first opening.

In another aspect of the present disclosure, the oil separator includes an external drain configured to convey the condensed transmission fluid back to the intern cavity.

In another aspect of the present disclosure, the transmission further include a moisture trap in fluid communication with the second tube opening. The moisture trap is configured to condense a water vapor entering the vent tube from the external atmosphere and to re-evaporate the condensed water.

In another aspect of the present disclosure, the moisture trap includes a moisture trap housing comprising a dry-air opening in fluid communication with the second opening of the vent tube, an interior surface defining an interior volume, and a lid portion having a moisture tube extending into the interior volume. The moisture tube is in fluid communication with the external atmosphere. An evaporator cup is concentrically disposed within the interior volume and spaced from the interior surface of the moisture trap housing. The evaporator cup includes an inward tapered lid defining a circumferential opening surrounding the moisture tube. An annular passageway is defined between the evaporator cup and the interior surface of the moisture trap housing.

In another aspect of the present disclosure, the moisture trap further includes a cap disposed over the moisture trap housing such that the cap cooperates with the lid portion of the moisture trap housing to define an external air passageway in fluid communication with the moisture tube.

In another aspect of the present disclosure, the predetermined pressure differential is less than the pressure differential that would cause an external seal of the transmission housing to deflect outward allowing leakage of the transmission fluid to the external atmosphere. The predetermined vacuum differential is less than the vacuum differential that would cause the seals to deflect inward allowing leakage of external air into the internal cavity of the transmission housing.

According to several aspects, a pressured controlled vent system for a transmission is disclosed. The system includes a vent tube having a first end defining a first opening, wherein the first end is configured to engage a transmission housing such that the first opening is in fluid communication with an upper portion of an internal cavity of the transmission housing; a second end defining a second opening configured to be in fluid communication with an external atmosphere; a bifurcated portion between the first end and the second end, wherein the bifurcated portion includes a first tube segment and a second tube segment in parallel with the first tube segment; a pressure relief valve disposed in-line within the first tube segment; and a vacuum relief valve disposed in-line within the second tube segment. The pressure relief valve cooperates with the vacuum relief valve to maintain a predetermined range of pressure differential between the first opening and the second opening.

In an additional aspect of the present disclosure, at least one of the pressure relief valve and vacuum relief valve is a spring loaded check valve in a normally closed state. The spring includes a spring rate configured to open the valve when a predetermined pressure differential between the first opening and second opening of the vent tube is exceeded.

In another aspect of the present disclosure, at least one of the pressure relief valve and vacuum relief valve includes a normally closed elastomer valve member configured to open when predetermined pressure differential between the first opening and second opening of the vent tube is exceeded.

In another aspect of the present disclosure, the pressured controlled vent system further includes an oil separator disposed in-line with the vent tube between the first end and the bifurcated portion.

In another aspect of the present disclosure, the oil separator includes a twining wall defining a tortuous path configured to condense a transmission fluid vapor and convey the condensed transmission fluid towards the first end of the vent tube.

In another aspect of the present disclosure, the pressured controlled vent system further includes a moisture trap in fluid communication with the second tube opening. The moisture trap is configured to separate a water vapor in the external atmosphere.

In another aspect of the present disclosure, the moisture trap includes a moisture trap housing having a lid portion defining a moisture tube extending into an interior volume of the moisture trap housing. An evaporator cup concentrically disposed within the interior volume and spaced from an interior surface of the moisture trap housing, defining a circumferential opening surrounding the moisture tube and an annular passageway between the evaporator cup and the interior surface of the moisture trap housing. The moisture tube is in fluid communication with the external atmosphere.

In another aspect of the present disclosure, the evaporator cup includes a conical top portion that slopes toward center of evaporator cup and defines the circumferential opening.

According to several aspects, a gearbox is disclosed. The gearbox includes a gearbox housing defining an internal cavity sealed from the external atmospheres and a pressure controlled vent system engaged to the gearbox housing. The pressure controlled vent system includes a vent tube having a first end in fluid communication with the internal cavity, a second end in fluid communication with the external atmosphere, and a bifurcated portion between the first end and the second end. The bifurcated portion includes a first tube segment having a pressure relief valve and a second tube segment having a vacuum relief valve in parallel with the first tube segment. The pressure relief valve cooperates with the vacuum relief valve to maintain a predetermined range of pressure differential between the interior cavity of the sealed gear box and the external atmospheres.

In another aspect of the present disclosure, the gear box further includes an in-line moisture trap proximal to the second end of the vent tube and an in-line oil separator proximal to the first end of the vent tube.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
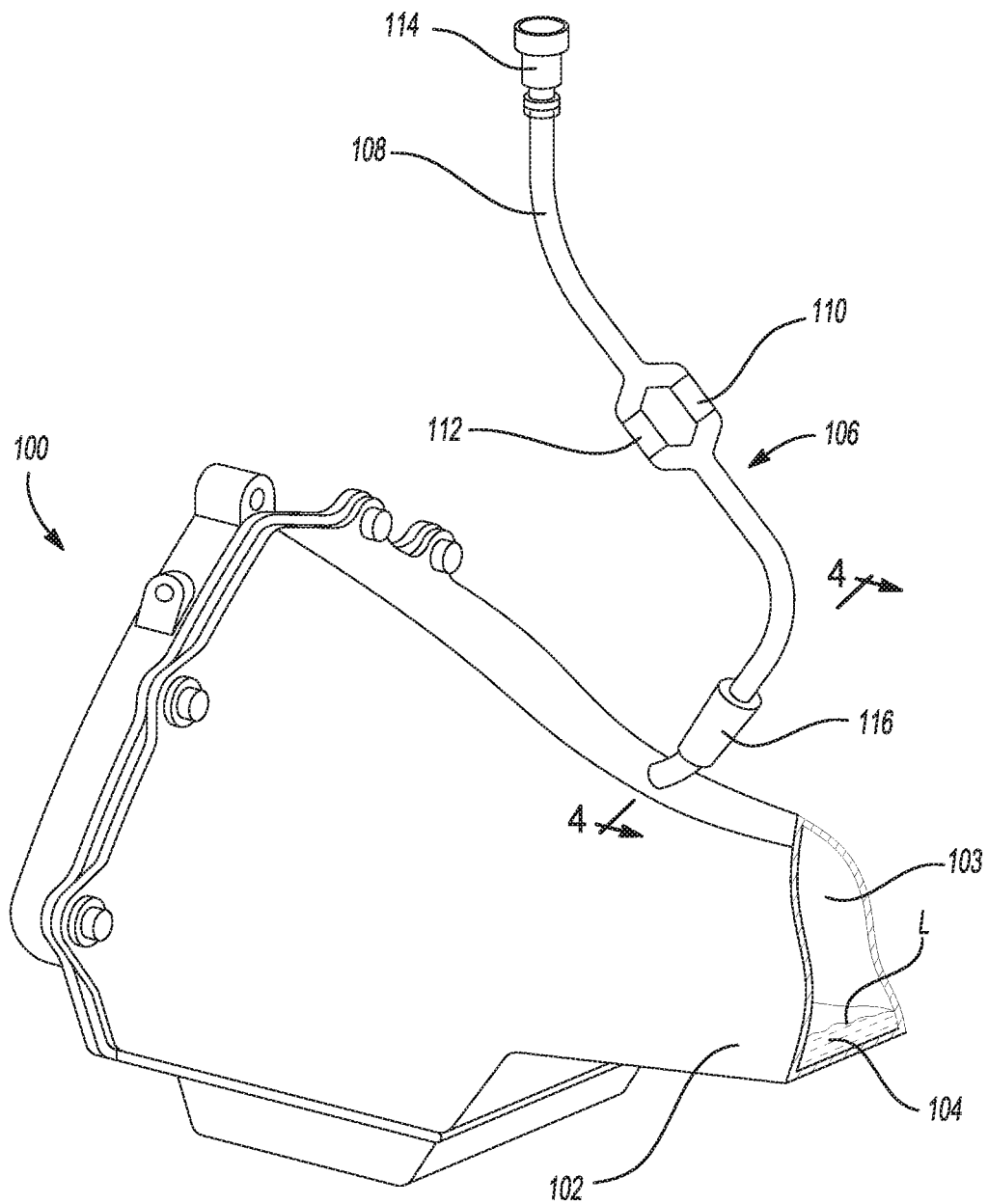
FIG. 1 is a partial perspective view of a transmission having a pressure controlled vent system according to an exemplary embodiment.

FIG. 1 shows a partial perspective view of a transmission for a motor vehicle, indicated generally by reference numeral 100. The transmission 100 includes a transmission housing 102 defining an internal cavity 103. Disposed in the internal cavity 103 are internal working components such as gear sets (not shown) and a transmission fluid 104 for providing lubrication and cooling for the working components.

The transmission 100 includes a pressure controlled vent system, indicated generally by reference numeral 106, engaged to the transmission housing 102. The pressure controlled vent system 106 includes a vent tube 108, a pressure relief valve 110, a vacuum relief valve 112 in parallel with the pressure relieve valve 110, a moisture trap 114, and an oil separator 116 on the opposite end of the moisture trap 114. The pressure controlled vent system 106 is configured to minimize the venting cycles, also known as breathing, of the transmission 100 to maintain a differential in pressure between the interior cavity of the transmission 100 and the external atmosphere within a predetermined pressure differential limit and a predetermined vacuum differential level limit. A pressure differential means a positive pressure measured in the internal cavity 103 relative to the external atmosphere, the unit of measurement is (+) PSIG (pounds per square inch gauge). A vacuum differential means a negative pressure measured in the internal cavity 103 relative to the external atmosphere, the unit of measurement is (−) PSIG.

When the transmission 100 is in operating mode, the temperature of the transmission fluid 104 rises due to the internal friction of the working components within the transmission housing 102 and dynamics of the transmission fluid 104 flowing through the transmission 100. The increase in temperature causes the transmission fluid 104, internal working components, and transmission air within the transmission housing 102 to expand, resulting in an increase in pressure within the internal cavity 103. The transmission air is mostly a mixture of air, moisture, and transmission fluid vapors. The temperature of the transmission fluid 104 may also decrease in normal operating mode resulting in decrease of pressure within the internal cavity 103, resulting in a partial vacuum, within the internal cavity 103. A number of conditions can cause the temperature within the transmission housing 102 to decrease after having been elevated in temperature, such as exposure to water while driving through a puddle or fording across a small stream. Another is the gradual decrease in temperature that occurs when the vehicle is idled or parked. The pressure controlled vent system 106 is configured to maintain the pressure/vacuum differential between the internal cavity 103 and the external atmosphere to be within a predetermined range to limit the number of cycles of venting without undue stress on the various seals of the transmission 100.

Figures 2, 3:
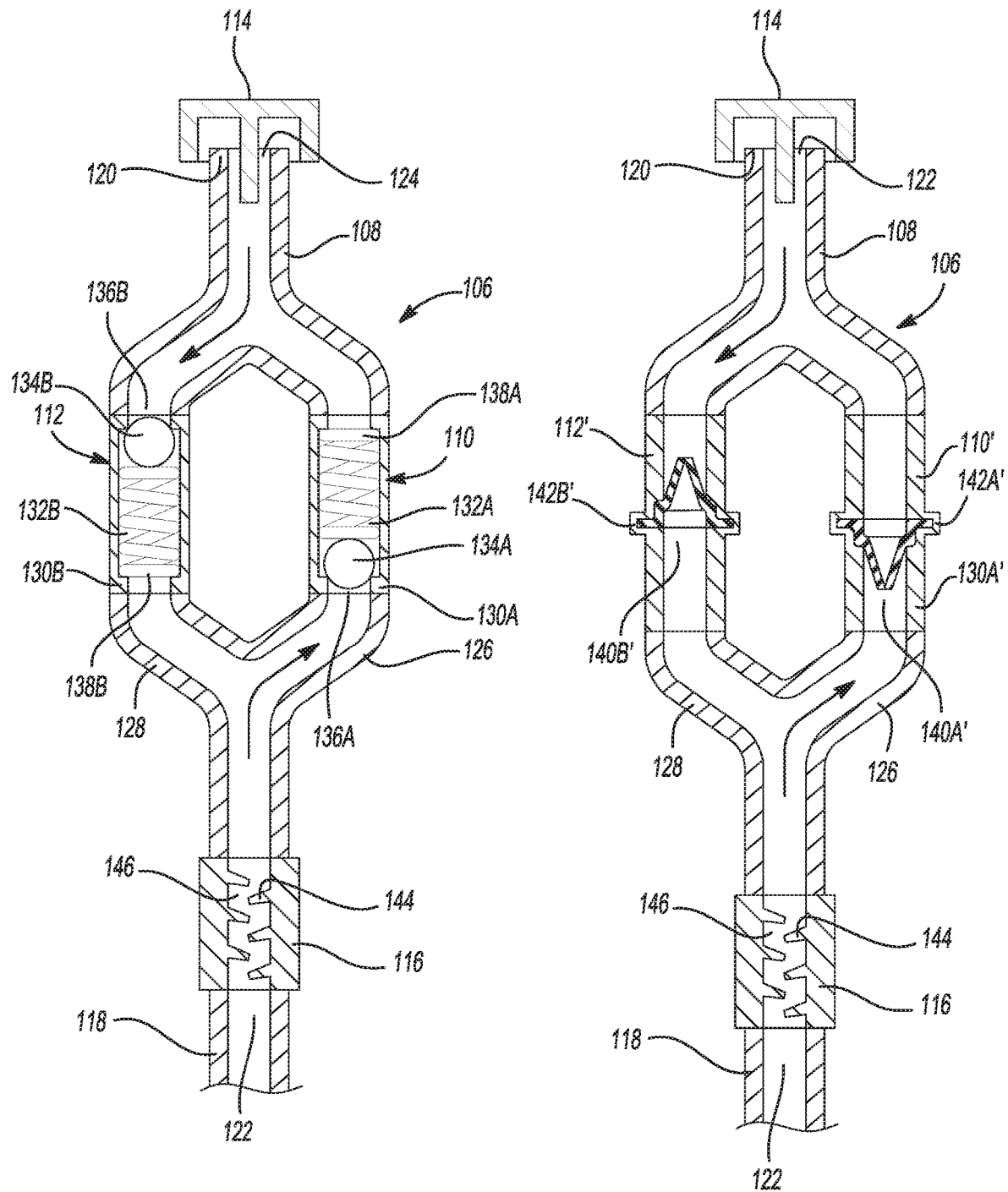
FIG. 2 is a diagram illustration of the pressure controlled vent system according to an exemplary embodiment.
FIG. 3 is a diagram illustration of an alternative embodiment of the pressure controlled vent system.

FIG. 2 shows a diagram illustration of the pressure controlled vent system 106 having a vent tube 108 with in-line parallel pressure and vacuum relief valves 110, 112. The vent tube 108 includes a first end 118 and a second end 120 opposite of the first end 118. The first end 118 of the vent tube 108 defines a first opening 122. The first end 118 engages the transmission housing such that the first opening 122 is in fluid communication with an upper portion of the internal cavity 103 above as surface level (L) of the transmission fluid 104 within the transmission housing 102. The second end 120 of the fluid tube 108 defines a second opening 124 and is in fluid communication with the external atmosphere. A portion of the vent tube 108 proximal to the first end 118 is bifurcated into a first tube segment 126 and a second tube segment 128. The first and second tube segments 126, 128 are rejoined proximal to the second end 120 of the vent tube 108. The pressure relief valve 110 is disposed in-line with the first tube segment 126 and the vacuum relief valve 112 is disposed in-line with the second tube segment 128.

The transmission air settles in the internal cavity 103 above the surface level (L) of the transmission fluid 104. Typically the level of the transmission fluid 104 is higher when the transmission 100 is in a non-operating mode than when the transmission 100 is in an operating mode. However, it is foreseeable that for certain transmission designs or transmission orientations within a vehicle, the level of the transmission fluid 104 could be higher within the transmission housing 102 when the transmission 100 is in an operating mode than when the transmission 100 is in a non-operating mode. Thus it is preferable that the first opening 122 of the fluid tube 108 is in fluid communication with the interior cavity 103 of the transmission 100 at a location above the maximum level (L) of the transmission fluid 104 regardless if the transmission 100 is in either operating or non-operating modes.

The pressure relief valve 110 cooperates with the vacuum relief valve 112 to provide selective fluid communication between the internal cavity 103 and the external atmosphere in order to maintain a predetermined range of pressure/vacuum differential between the internal cavity 103 and the external atmosphere pressure. The pressure relief valve 110 and the vacuum relief valve 112 are located in parallel between the first end 118 and the second end 120 of the vent tube 108. The pressure relief valve 110 is configured to relieve a pressure within the internal cavity 103 by venting the transmission air within the internal cavity 103 to the external atmosphere when a predetermined pressure differential between the internal cavity 103 and atmosphere is exceeded. The vacuum relief valve 112 is configured to relieve a vacuum within the internal cavity 103 by venting external air into the internal cavity 103 when a predetermined vacuum differential between the internal cavity 103 and the external atmosphere is exceeded.

Still referring to FIG. 2, an example of a mechanically activated pressure relief valve 110 include a valve body 130A defining a valve cavity 132A in which a spherical member 134A seals a valve port 136A in fluid communication with the valve cavity 132A. The spherical member 134A is urged against the valve port 136A by a biasing member 138A, such as a compression spring 138A. The biasing member 138A includes a spring rate that allows the spherical member 134A to move away from the valve port 136A, thus opening the valve port 136A, when a predetermined pressure differential between the internal cavity 103 and the external atmosphere is exceeded. The opening of the valve port 136A allows the transmission air to vent to the external atmosphere. The spherical member 134A returns to seal the valve port 136A once the pressure differential drops below the predetermined value.

Similarly, an example of a mechanically activated vacuumed relief valve 112 include a valve body 130B having a valve cavity 132B in which a spherical member 134B seals a valve port 136B in fluid communication with the external atmosphere 132B. The spherical member 134B is urged against the valve port 136B by a biasing member 138B. The biasing member 138B includes a spring rate that allows the spherical member 134B to move away from the valve port 136B, thus opening the valve port 136B, when a predetermined vacuum differential between the internal cavity 103 and the external atmosphere is exceeded. The opening of the valve port 136B allows the external air to vent to the internal cavity 103. The spherical member 134B returns to seal the valve port 136B once the vacuum differential drops below the predetermined value.

FIG. 3 shows an alternative embodiment of a parallel pressure relief valve 110' and vacuum relief valve 112' for the pressure controlled vent system 106. The pressure relief valve 110' includes a valve body 130A' defining a flow passageway 140A'. An elastomer one-way valve member 142A' is disposed within the flow passageway 140A' and is normally in a closed state to seal the flow passageway 140A' until a predetermined pressure differential between the internal cavity 103 and the external atmosphere is exceeded. The elastomer includes a resiliency that when the pressure differential is exceed, the elastomer one-way valve member 142A' opens to relieve the pressure within the internal cavity 103 by venting the transmission air within the internal cavity 103 to the external atmosphere.

Similarly, the vacuum relief valve 112' an elastomer one-way valve member 142B' disposed within a flow passageway 140B' and is normally in a closed state to seal the flow passageway 140B' until a predetermined vacuum differential between the internal cavity 103 and the external atmosphere is exceeded. The elastomer includes a resiliency that when the vacuum differential is exceed, the elastomer one-way valve member 142B' opens to relieve the vacuum within the internal cavity 103 by venting the external air into the internal cavity 103. The elastomer valves may be formed of a natural rubber or synthetic polymer. Examples of elastomer valves includes, but are not limited to, flapper valves, duckbill valves, and slit membrane valves, which are configured to open between a range of 2 to 8 PSIG of pressure/vacuum differential.

Referring to both FIGS. 2 and 3, an embodiment of an oil separator 116 is disposed in-line with the vent tube 108 between the first end 118 and the set of pressure and vacuum relief valves 110, 112, 110', 112'. The oil separator 116 includes a twining wall 144 defining a tortuous path 146 fluidly connecting the internal cavity 103 of the transmission 100 with the set of parallel pressure and vacuum relief valves 110, 112, 110', 112'. As the pressure relief valve opens 110, 110', a portion of the transmission air within the pressurized internal cavity 103 passes through the tortuous path 146 of the oil separator 116. As microscopic droplets of transmission fluid collides with the wall, the droplets coalesce with other droplets forming larger droplets and falls back into the internal cavity 103 under the force of gravity; thus separating the transmission fluid from the outgoing transmission air.

Figure 4:
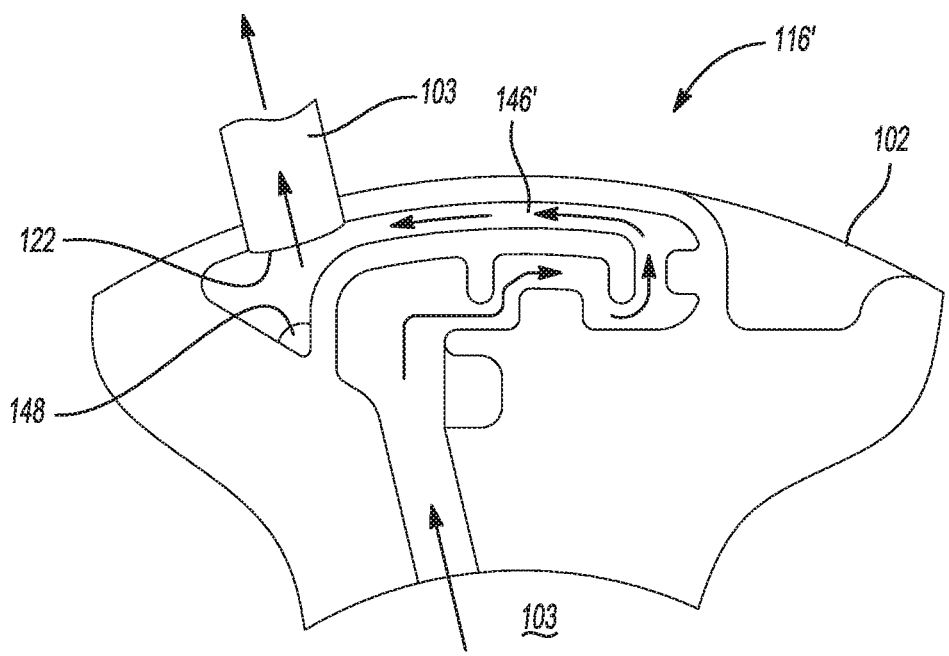
FIG. 4 is diagram illustration of a partial cross-sectional view, taken along section line 4-4 of FIG. 1, showing an alternative embodiment of an oil separator located in the transmission housing.

FIG. 4 shows cross-sectional view of an alternative embodiment of an oil separator 116, indicated generally by reference number 116'. In this alternative embodiment, the oil trap separator 116' includes a torturous path 146' defined in a portion of the transmission housing 102. The tortuous path 146' extends from a lower elevation to a higher elevation, with respect to the direction of gravity, fluidly connecting the internal cavity 103 with the first open end 122 of the vent tube 108. The oil trap separator 116' also includes an internal drain 148' that conveys the coalesced transmission fluid 104 back to the internal cavity 103.

Figure 5:
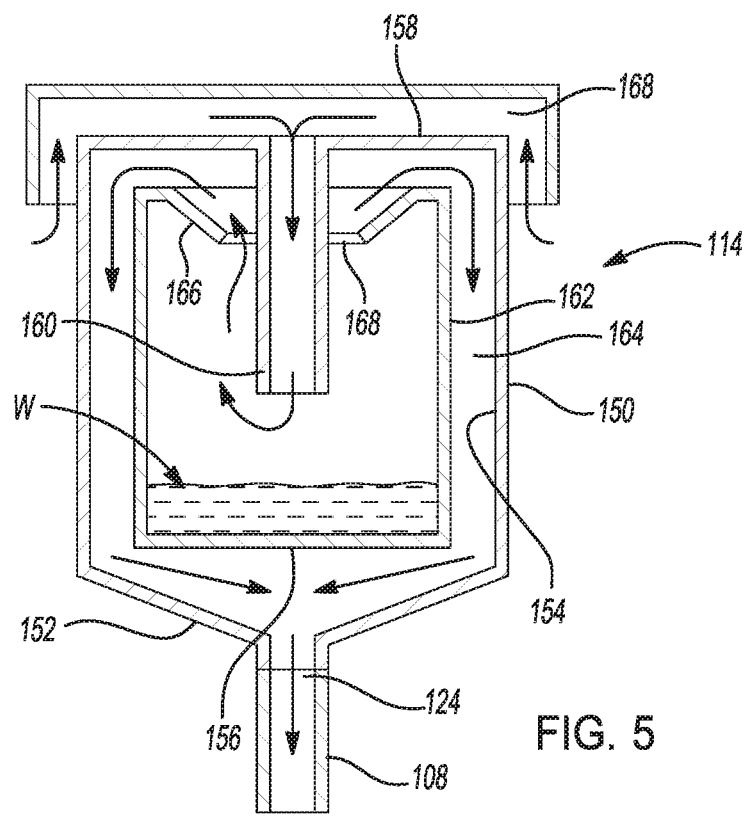
FIG. 5 is a diagram illustration of a cross-sectional view of an embodiment of a moisture trap according to an exemplary embodiment.

FIG. 5 shows a diagram illustration of a cross-sectional view of an exemplary moisture trap 114. The moisture trap 114 includes a moisture trap housing 150 defining a dry-air opening 152 in fluid communication with the second opening 124 of the vent tube 108. The moisture trap housing 150 further includes an interior surface 154 defining an interior volume 156 and a lid portion 158 defining a moisture tube 160 extending inward toward the interior volume 156. An evaporator cup 162 is concentrically disposed within the interior volume 156 and spaced from the interior surface 154 of moisture trap housing 150. An annular passageway 164 is defined between the evaporator cup 162 and the interior surface 154 of the moisture trap housing 150. The evaporator cup 162 includes a conical lid 166 tapering inward toward the center of the evaporator cup 162. The conical lid 166 defines a circumferential opening 168 surrounding the moisture tube 160. A moisture trap cap 170 is disposed over the moisture trap housing 150 such that the cap 170 cooperates with the lid portion 158 of the moisture trap housing 150 to define an external air passageway 168 in fluid communication with the moisture tube 160.

When the vacuum valve 112, 112' is open, an airflow of external air is drawn into the moisture trap 114 through the external air passageway 168 defined between the cap 170 and the moisture trap housing 150. The airflow is drawn downward through the moisture tube 160 into the evaporator cup 162. The airflow is deflected by the conical lid 166 and exits the evaporator cup 162 through the circumferential opening 168 and flows through the annular passageway 164 exiting the dry-air opening 152 to the internal cavity 103. As the airflow swirlingly changes direction within the evaporator cup 162, the swirling action causes the micro-droplets of water to collide and coalesce. As the droplets of water grows in size, the weight of the droplet settles within the evaporator cup 162 as standing water (W). Once the vacuum relief valve 112 is closed, the standing water (W) within the evaporator cup 162 is eventually evaporated back into the atmosphere. The evaporation of standing water (W) in the evaporator cup 162 is assisted by the warmer transmission air exiting the internal cavity 103 of the transmission housing 102 when the pressure relief valve 110 is open.

The range of pressure/vacuum differential between the internal cavity 103 and atmosphere is predetermined to minimize the number of air exchanges between the internal cavity 103 and external atmosphere to extend the life of the transmission 100 by avoiding transmission fluid 104 loss and exposure of external contaminates. The predetermined range of pressure/vacuum differential includes a maximum pressures differential and a maximum vacuum differential with respect to the internal cavity 103.

It is preferable that the maximum pressure differential is less than the pressure differential that would cause the seals of the transmission cases to deflect outward thus allowing for the leak of transmission fluid 104. It is further preferable that the maximum vacuum differential is less than the vacuum differential that would cause the seals to deflect inward thus allowing for the leak of air and contaminants into the internal cavity 103 of the transmission housing. In other words, it is preferred that the predetermined range of pressure differential is within a range within the operating condition of the transmission such that the transmission fluid 104 is not expelled through the various seals of the transmission 100 when the internal cavity 103 is under pressure and that the various seals of the transmission 100 do not implode when the internal cavity 103 operates under a vacuum.

An example of a preferred predetermined range of pressure differential between the internal cavity 103 and external atmosphere for a typical transmission 100 may be (−8 to −2) PSIG to (+2 to +8) PSGI, preferably −4 PSIG to +4 PSIG. It should be appreciated that the preferred range for a particular type of transmission 100 may be determined based on experimental testing to determine the maximum pressure and maximum vacuum differential between the internal cavity 103 and atmosphere during normal operating conditions before integrity of the transmission 100 seals are compromised. While a transmission 100 has been described, it should be appreciated that the disclosure may be applicable to that of a sealed gearbox such as, including but not limited, to a front or rear differential unit, transfer case, and power take-off unit.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A gearbox of a motor vehicle having a pressure controlled vent system, the gearbox comprising:
    a transmission housing defining an internal cavity, wherein the transmission housing is sealed to prevent fluid communication between the internal cavity and an external atmosphere;
    a pressure relief valve in fluid communication with an upper portion of the internal cavity, wherein the pressure relief valve is configured to vent a transmission air within the upper portion of the internal cavity to an external atmosphere when a predetermined pressure differential between the internal cavity and atmosphere is exceeded;
    a vacuum relief valve in fluid communication with the upper portion of the internal cavity, wherein the vacuum relief valve is configured to vent an external air into the internal cavity when a predetermined vacuum differential between the internal cavity and the external atmosphere is exceeded; and
    a vent tube having:
        a first end defining a first opening in fluid communication with the upper portion of the internal cavity;
        a second end defining a second opening in fluid communication with the external atmosphere; and
        a bifurcated portion between the first end and the second end, wherein the bifurcated portion includes a first tube segment and a second tube segment in parallel with the first tube segment, wherein the pressure relief valve is disposed in-line with the first tube segment and the vacuum relief valve is disposed in-line with the second tube segment.

2. The gearbox of claim 1, wherein one of the pressure relief valve and the vacuum relief valve includes an elastomer valve member configured to open when the predetermined pressure or vacuum differential between the internal cavity and atmosphere is exceeded.

3. The gearbox of claim 2,
    wherein the predetermined pressure differential is less than the pressure differential that would cause an external seal of the transmission housing to deflect outward allowing leakage of the transmission fluid to the external atmosphere; and
    wherein the predetermined vacuum differential is less than the vacuum differential that would cause the seals to deflect inward allowing leakage of external air into the internal cavity of the transmission housing.

4. The gearbox of claim 1, further comprising an oil separator disposed in-line with the vent tube between the bifurcated portion and the first end, wherein the oil separator include a twining wall defining a tortuous path configured to condense a transmission fluid vapor contained in the transmission air being vented to the external atmosphere and redirect the condensed transmission fluid back into the internal cavity.

5. The gearbox of claim 4, wherein the oil separator is defined in a portion of the transmission housing proximal to an upper portion of the internal cavity, and includes a twining wall defining a tortuous path extending from the internal cavity to the first opening.

6. The gearbox of claim 5, wherein the oil separator includes an external drain configured to convey a condensed transmission fluid back to the internal cavity.

7. The gearbox of claim 1, further comprising a moisture trap in fluid communication with the second tube opening, wherein the moisture trap is configured to condense a water vapor entering the vent tube from the external atmosphere and to re-evaporate the condensed water vapor.

8. The gearbox of claim 7, wherein the moisture trap includes:
    a moisture trap housing comprising a dry-air opening in fluid communication with the second opening of the vent tube, an interior surface defining an interior volume, and a lid portion having a moisture tube extending into the interior volume, wherein the moisture tube is in fluid communication with the external atmosphere;
    an evaporator cup concentrically disposed within the interior volume and spaced from the interior surface of the moisture trap housing, wherein the evaporator cup includes an inward tapered lid defining a circumferential opening surrounding the moisture tube; and
    an annular passageway defined between the evaporator cup and the interior surface of the moisture trap housing.

9. The gearbox of claim 8, wherein the moisture trap includes a cap disposed over the moisture trap housing such that the cap cooperates with the lid portion of the moisture trap housing to define an external air passageway in fluid communication with the moisture tube.

10. A transmission having a pressure controlled vent system, comprising:
    a transmission housing defining an internal cavity, wherein the transmission is sealed to prevent fluid communication between the internal cavity and an external atmosphere;
    a pressure relief valve in fluid communication with an upper portion of the internal cavity, wherein the pressure relief valve is configured to vent a transmission air within the upper portion of the internal cavity to an external atmosphere when a predetermined pressure differential between the internal cavity and atmosphere is exceeded;
    a vacuum relief valve in fluid communication with the upper portion of the internal cavity, wherein the vacuum relief valve is configured to vent an external air into the internal cavity when a predetermined vacuum differential between the internal cavity and the external atmosphere is exceeded;
    a vent tube having:
        a first end defining a first opening in fluid communication with the upper portion of the internal cavity;

a second end defining a second opening in fluid communication with the external atmosphere; and a bifurcated portion between the first end and the second end, wherein the bifurcated portion includes a first tube segment and a second tube segment in parallel with the first tube segment, wherein the pressure relief valve is disposed in-line with the first tube segment and the vacuum relief valve is disposed in-line with the second tube segment; and a moisture trap in fluid communication with the second tube opening, wherein the moisture trap is configured to condense a water vapor entering the vent tube from the external atmosphere and to re-evaporate the condensed water vapor, wherein the moisture trap includes:

a moisture trap housing comprising a dry-air opening in fluid communication with the second opening of the vent tube, an interior surface defining an interior volume, and a lid portion having a moisture tube extending into the interior volume, wherein the moisture tube is in fluid communication with the external atmosphere;

an evaporator cup concentrically disposed within the interior volume and spaced from the interior surface of the moisture trap housing, wherein the evaporator cup includes an inward tapered lid defining a circumferential opening surrounding the moisture tube; and an annular passageway defined between the evaporator cup and the interior surface of the moisture trap housing.

11. The transmission of claim 10, further comprising an oil separator disposed in-line with the vent tube between the bifurcated portion and the first end, wherein the oil separator include a twining wall defining a tortuous path configured to condense a transmission fluid vapor contained in the transmission air being vented to the external atmosphere and redirect the condensed transmission fluid back into the internal cavity.

12. The transmission of claim 11, wherein the oil separator is defined in a portion of the transmission housing proximal to an upper portion of the internal cavity, and includes a twining wall defining a tortuous path extending from the internal cavity to the first opening.

13. The transmission of claim 12, wherein the oil separator includes an external drain configured to convey a condensed transmission fluid back to the internal cavity.

* * * * *